April 10, 1945.	C. F. W. FORSSBERG	2,373,110
WIND INSTRUMENT
Filed June 30, 1939	7 Sheets-Sheet 3

INVENTOR:
Carl Fr. Wm Forssberg

Patented Apr. 10, 1945

2,373,110

REISSUED

UNITED STATES PATENT OFFICE 2,373,110

WIND INSTRUMENT

Carl F. W. Forssberg, Brooklyn, N. Y.

Application June 30, 1939, Serial No. 282,221

6 Claims. (Cl. 84—387)

This invention relates to musical wind instruments and horns which may be considered as related both to the brasses and wood wind instruments utilizing an air column, but being preferably assembled and built up from a few simple parts of metal or plastic material, or of both together.

The main object of my invention is to provide an instrument or horn of the character indicated which will practically avoid the use of pipes and tubes, etc., in its construction by including special covered channels or grooves formed in at least one member or even in two or more members forming main portions of the structure of the instrument.

Another object is to produce such an instrument from molded material such as plastics or die castings of metal in order to simplify construction and greatly reduce cost of manufacture and thus facilitate marketing the instrument at such a low figure as to encourage general use in large quantities.

A further object is to make an instrument of this type of at least one channel or body member or even two main channel members and a rigidly associated or intermediate sandwich structure, sheet or member, which when assembled by cementing or riveting or even soldering or welding together will at once form the main body of the instrument to which a mouthpiece may be added to complete the simplest embodiment which may be taken to correspond to a bugle.

Yet another object is to do away with slides for fine tuning and instead have a simple, partly rotatable or slidable adjusting valve which is capable of fine adjustments.

It is also an object to have the instrument provided with valves for playing in all desirable keys so that it may take its proper place with the cornet, trumpet, fluegelhorn, trombone and alto horn, etc.

It is even an object to do away altogether with exposed tubular slides for changing the key of the instrument from F to G or vice versa in the embodiment corresponding to the bugle; and from A to B♭, and/or, from B♭ to C, etc., in the form corresponding to the trumpet or cornet, by having a novel form of key changing mouthpiece which is arranged to cooperate with one or more fixed loops of tubing or channel in the air column in order to cut in or cut out said loops at will.

It should be mentioned that it is an object withal so to arrange the channels and double them on themselves or each other and otherwise condense the entire construction and all dimensions of the instrument as well as to lighten the same without sacrificing pitch, volume, tone or overtones so that an exceedingly compact, portable and attractive as well as effective wind instrument results, which if made of the modern plastics, may have any one of a large range of colors and finishes.

Other objects and numerous advantages of the present instrument and accruing from its nature, construction and practical use will appear more fully in detail as this specification proceeds.

In order to facilitate ready comprehension of this invention and its various features, the same is illustrated by way of non-limiting examples in the accompanying drawings forming part hereof, and in which

Fig. 47 illustrates a modification of the instrument of Fig. 12.

Fig. 48 is the upper fragment of one of the channel members of said instrument, while Fig. 49 is the upper portion of the other channel member, the mouthpiece being omitted better to reveal the construction.

Fig. 50 shows the mouthpiece of the same instrument, while Fig. 51 is a plan view of a tuning valve of the instrument of Fig. 47.

Fig. 52 is a section of part of a modified instrument as taken on line 52, 52 in Fig. 53, and illustrates a slide for tuning.

Fig. 53 is a transverse section of the instrument of Fig. 52 on line 53, 53 in Fig. 52.

Fig. 54 is a side elevation of the upper portion of the instrument of Fig. 47.

Fig. 61 illustrates the correspondingly opposite channel member, while

Finally.

Throughout the views, the same reference numerals indicate the same or like parts.

Among the brass wind instruments used in musical organizations such as bands and orchestras as well as in military organizations, and also for solo work, etc., it is noteworthy that no radical changes have been introduced for quite a long time. All of these instruments occupy considerable space and require more or less large carrying cases or covers, but judged by the cubical content of their air columns, could well be reduced in size. In case a player is near sighted or has poor eyes, and uses a stand for his music, the length and actual size of the instrument used may prevent a sufficiently near approach to the music to see well. It is also quite obvious that such brass instruments consist mainly of tubing which is bent at several points and also has several joints which require to be soldered or brazed, and the manufacture thereof requires great skill, much fitting, adjustment and finishing, worth from ten to fifty or more times the actual value of the material of which the instruments are made. The necessity for polishing such instruments and carefully cleaning and taking care of them, and their very high price, as a rule, militates against general adoption and use and also prevents many talented people from learning to play upon them and even from learning music for this reason.

Now, in order to avoid all such disadvantages and particularly with the foregoing and other objects in mind, the present invention has been designed to fill a place of its own and greatly encourage the study and playing of good music.

Figures 9, 10, 11:
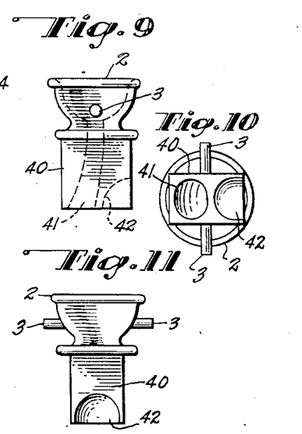
Fig. 9 is an enlarged front elevation of the mouthpiece alone of Figs. 1, 2, 3, 4 and 8.
Fig. 10 is another view of the same as seen from the bottom.
Fig. 11 is a further side elevation of the enlarged mouthpiece.

Hence, in the practice of my invention, an instrument body, generally indicated at 1 has a mouth piece 2 which is removably inserted and shown alone in Figs. 9, 10 and 11 in enlarged form. A pair of oppositely extending projections 3, 3 are fixed upon the mouthpiece, while upon the upper portion of the instrument proper are a pair of opposite side horns or projections 4, 4, so that if an elastic member 5 is caught beneath the projections 4, 4 and passed over the mouthpiece projections 3, 3, said member will tend to hold the mouthpiece down in position and retain the same against accidental loss.

Figure 5:
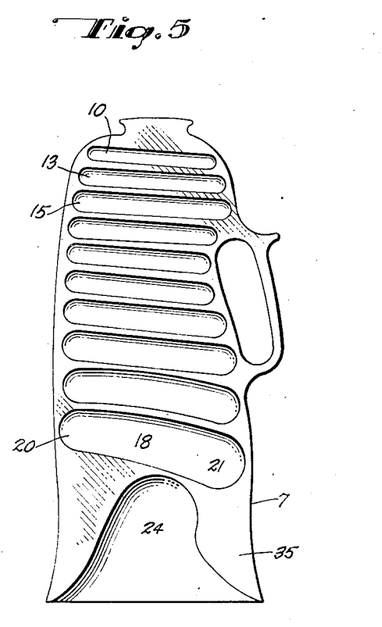
Fig. 5 shows an opposite or corresponding main channel member of the same instrument.
Figure 6:
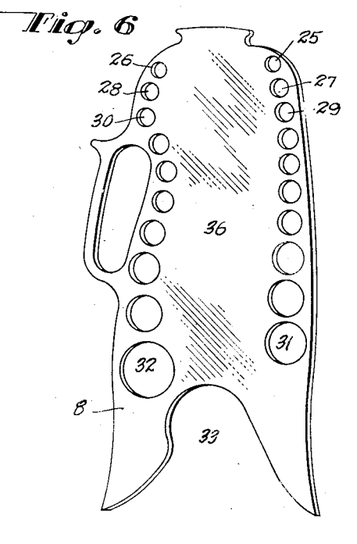
Fig. 6 illustrates in partial perspective an intermediate member or sandwich sheet or plate intended to be secured between the two corresponding main channel members of Figs. 4 and 5.
Figure 7:
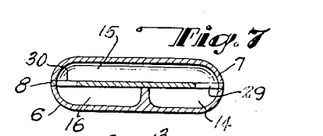
Fig. 7 is a transverse section taken on line 7—7 in Fig. 1.

Before going into further detail in regard to the mouthpiece and its possible modifications, it is perhaps better to direct attention to the main feature of the invention which refers to the general construction of the body of the instrument. The instrument proper is preferably composed of three main members, namely, two opposed outer members, which may for convenience be termed channel members 6 and 7, and an intermediate member or sandwich plate 8. The channel member 6 has a plurality of channels or grooves 9, 11, 12, 14, 16, 17, 22, etc., (Fig. 4) and the other channel member 7 has corresponding grooves or channels 10, 13, 15, 18, etc., (Fig. 5) while the sandwich plate 8 as shown in Fig. 6 has a plurality of marginal holes along the two sides at 25 27, 29 and 31, etc., and 26, 28, 30 and 32, etc., which connect the outer ends of channels 9 and 11 in member 6 with channel 10 in member 7, the higher end of channel 13 in member 7 with the outer end of channel 12 in member 6, the lower end of channel 13 in member 7 with the higher end of channel 14 in member 6, and so on down to channel 17 in member 6 which connects at its lower end through aperture 31 in the sandwich plate with the upper end of channel 18 in member 7. The lower end of channel 18 connects through aperture 32 with channel 22 in member 6, and this channel enlarges into a half bell 23 which is open to and connects directly with the correspondingly opposite half bell portion 24 in member 7 through the open slot 33 in the lower end of the sandwich sheet 8 to form the bell 36.

It should be noted that the sandwich sheet or plate 8 is preferably flat in the form of the instrument disclosed in Figs. 1 through 8, as well as in other forms also shown, and the corresponding surfaces 34 and 35 of channel members 6 and 7 are intended to be correspondingly flat so as to make contact entirely about the majority of the channels with the sandwich sheet through its general extent. It should likewise be noted that the main intermediate area 36 of the sandwich sheet serves to cover the channels 9—17 of the channel members so as to convert them into conduits or the equivalents of tubes, while the marginal apertures in said sandwich sheet or plate serve to connect one end of a channel in one channel member on one side of the sandwich sheet to one end of another channel in the other channel member on the other side of said sheet or plate. The channels are so arranged in the two members on the opposite sides of the plate 8 that if the instrument stands upright, drainage for water of condensation will tend to occur by gravity.

The two channel members and the sandwich sheet or plate are preferably made of plastic material such as any modern or known plastic that can be given a definite form by a mold or die, examples of such being the cellulose derivatives, phenol urea and phenol formaldehyde products, vinyl resins, etc., ebonite or shellac compositions, polymerized derivatives of methacrylic acid, etc., or said members may be made of any kind of die cast metal or alloy. In case plastic material is used, the members may be cemented or fused together by means of a suitable solvent or a solution of the plastic used, but in case die castings are used for the channel members a metal sheet can be used for the sandwich plate and these members screwed, soldered, brazed, fused or riveted together, as may be most suited to the particular material used. I prefer to use a plastic, as it is convenient merely to apply a solvent or a plastic cement to the flat general surfaces 34 and 35 of both members and to both sides of the sandwich plate, and then bring the two members together with said plate between, when it will shortly be found that these members are firmly united into a single inseparable unit. The tone varies somewhat according to the metal or plastic used, but mainly depends on the form of the channel section and the length of the channel. A handle 37 may be added to the instrument together with the thumb piece 38, the opening 39 serving to accommodate the fingers when the instrument is in use, so that it will be convenient to hold the whole in horizontal position.

Figures 1, 2:
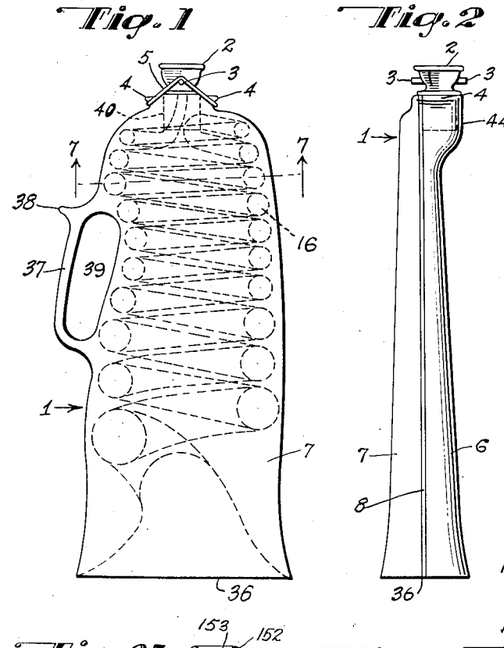
Fig. 1 is an elevation of a form of my instrument which may be considered as corresponding in pitch, tone and volume to an army bugle and embodying certain main principles of my invention.
Fig. 2 is a side view of the same.
Figures 3, 8:
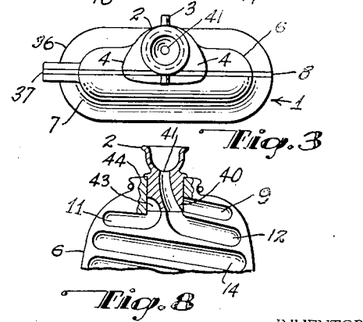
Fig. 3 is a top plan view of the same instrument.
Fig. 8 is a fragmentary view of the upper portion of Fig. 4, showing the mouthpiece in altered position.
Figure 4:
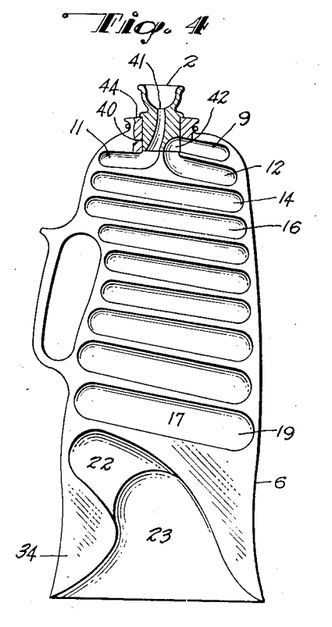
Fig. 4 illustrates one of the main channel members of the instrument of Figs. 1–3 prior to assembling, with a portion of the upper end and a mouthpiece in section.

Referring again to the mouthpiece 2, the shank 40 is rectangular in cross section (Figs. 1, 3, 4, 9, 10 and 11) and has a main conduit or channel 41 which, as shown in Figs. 1 and 4, connects with the inner end of channel 11 in channel member 6, while a short arcuate channel 42 in the lower portion of the shank on the other side serves to connect the inner ends of channels 9 and 12 in the same channel member. In this position the mouthpiece may be used to direct a sound through channel 11 and by way of plate aperture 26 through channel 10 and thence through plate aperture 25 through channel 9 and through mouthpiece bottom channel 42 into channel 12, and thence through the remaining plate apertures and successive channels in both channel members. Naturally, the tones produced will be pitched according to the total length of the air column of the instrument, and if the latter is intended to correspond to a bugle, the same may be pitched at F. The mouthpiece is replaceable so as to change the pitch to G, for example, and to effect this change, it is but necessary to lift said mouthpiece out of the instrument and, after turning the same one half turn without inverting it, to replace the same in the instrument so as to occupy the relatively reversed position illustrated in Fig. 3, in which the main channel 41 connects directly with channel 12 instead of with channel 11, while the shank 40 forms a complete cutoff for channel 9 and the lower shank channel 42 cuts off channel 11 by being itself directed against the interior wall of the mouthpiece socket 43, the result being that the two stationary channels 9 and 11 and the longer channel 10 connected thereto through plate apertures 25 and 26 are entirely blind and cut out of the air column so as to be inactive. As the air column is then shorter, the pitch will be higher.

Figure 13:
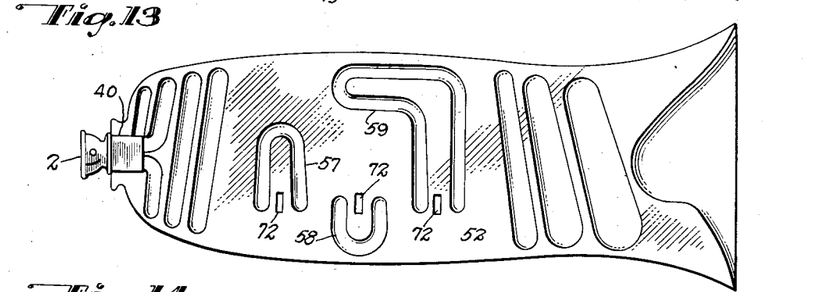
Fig. 13 illustrates one of the main channel members of the same instrument.
Figures 14, 15, 16, 17, 22:
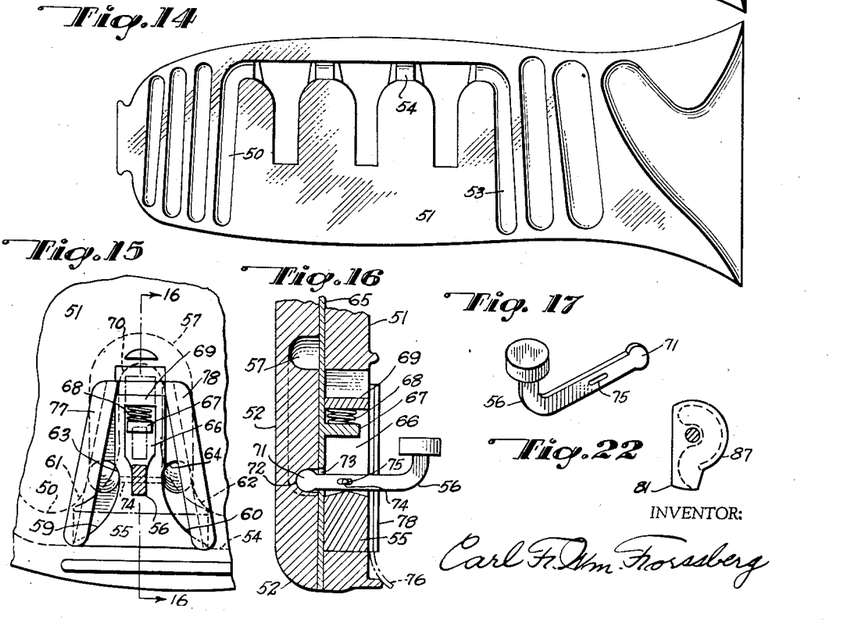
Fig. 14 shows the other or correspondingly opposite main channel member of the instrument of Fig. 12.
Fig. 15 is an enlarged fragmentary view of valve detail.
Fig. 16 is a section of Fig. 15 taken on line 16—16.
Figs. 17 shows a valve key of Figs. 12, 15 and 16 in perspective.
Fig. 22 is a top plan view of the same tuning valve with the shaft and control knob cut off and the interior walls indicated by broken lines.
Figure 38:
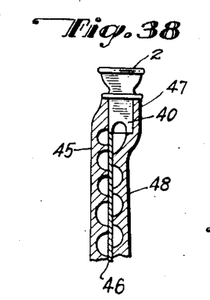
Fig. 38 is a vertical section of a modification of the upper part of the instrument of Figs. 1 and 2, as seen from the same point of view as Fig. 2.

In the figures thus far described, the shank 40 of the mouthpiece member lies against the sandwich sheet or plate 8 upon one side and is in fact located wholly upon that side of said plate in the socket or enlargement 44 of channel member 6, and is retained in the socket by the elastic 5. However, as shown in Fig. 38, the shank can be disposed directly against the channel member 45 (which corresponds to member 7, extending through the sandwich sheet 46 (which corresponds to plate 8), while the socket 47 of channel member 48 (corresponding to socket 44 on member 6) projects less than said socket 44 as a consequence, which is the main advantage gained. The same construction may be incorporated in the more elaborate valved instrument generally indicated at 49 in Figs. 12, 13 and 14, although the construction can also be like that of Figs. 1 through 8.

Figure 12:
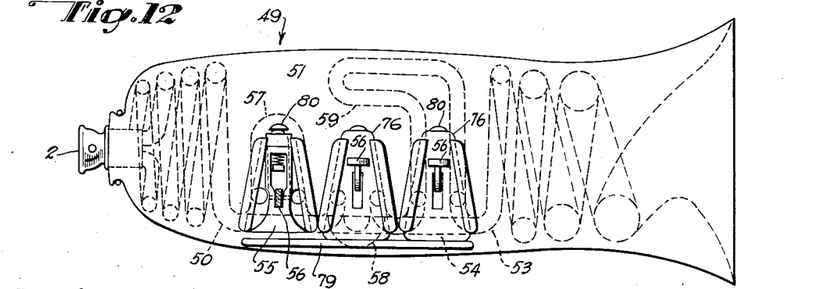
Fig. 12 is an elevation of another form of the instrument including three key valves so as to provide for playing all manner of musical selections in any key.

In Fig. 12, one of the channels 50 leading from the mouthpiece 2 in one channel member 51, before reaching the lower end channels 53 and the bell, has a passage 51 which may be interrupted and lengthened by a plurality of valves 55, which are controlled by manual keys or levers 56, 56, etc., by which said valves may be individually depressed.

These valves are practically the same in form and construction, so that a description of one describes them all, but each controls a different length of channel loop, the first valve controlling a medium channel loop 57, the second valve a smaller loop 58 and the third a much longer loop 59, so as to provide for any and all half tones in the chromatic scale. The passage 54 is blocked when a valve 55 is depressed by a lever 56 as in Figs. 15 and 16, but then, when the lower edge of the valve member 55 comes into contact with the bottom wall of passage 54, the upper curved sides 59 and 60 are spaced from the fixed curved sides of upper valve seats 61 and 62 so as to present curved passages up to the apertures 63 and 64 in the sandwich plate 65 (Fig. 16) which connect directly with the ends of channel loop 57 in channel member 52. Each valve has an open area 66 in which a rigid spring support 67 fixed upon the sandwich plate may be located for the purpose of supporting a resilient member 68 tending to raise the upper portion 69 of the valve so that said valve will normally occupy the upper raised position in operating space 70 in Fig. 15 so as to take against seats 61 and 62 and leave passage 54 clear. The lever or key 56 is provided upon its inner end with a fulcrum head 71 lying in a recess 72 in channel member 52, the lever passing through a slot 73 the sandwich plate 65 and having an operating pin 74 of valve 55 passing through an elongated aperture or slot 75 so as to allow arcuate rising and falling movements of the lever to occur without binding when operating the valve.

In order to cover each valve when assembling the same, a somewhat flexible cover plate 76 having a clearance opening or slot (not shown) for the valve key or lever 56, a pair of undercut gibs 77, 78 holding said plate in place. Said plate may be set into position by sliding the same upward over a bottom stop 79 and under the overhanging portions of the gibs 77, 78 until the upper end of the plate meets upper stop 80, when the lower end will snap into posiiton above said bottom stop 79 and remain between the gibs and stops. Of course, other means occurring to anyone skilled in the art may be used to hold the cover plates for the valves in place and the covers need not be flexible, in contrast with those shown, and in fact, even the exact type or detail of the valves disclosed need not be used. It is also possible, and even feasible to use different plastic material for the valves than for the sandwich plate, valve cover plate and channel member, or even a metal or alloy, without essentially changing the shape of the parts involved and the plastic material may be so selected as to have antifriction characteristics with respect to the material of which said channel member is composed. The main features thus considered in connection with Figs. 12 through 17 refer to the valves and channel loops controlled thereby for playing in any key desired.

Figure 18:
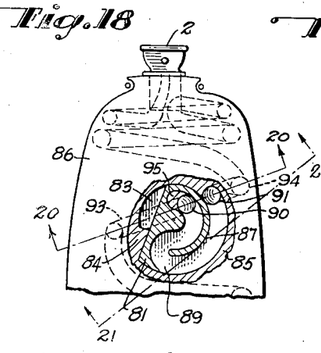
Fig. 18 is a fragmentary view of the upper portion of a modification of the instrument of Figs. 12, 15 and 16 with a portion broken away to disclose the interior construction of a tuning valve.
Figures 19, 26, 28, 29:
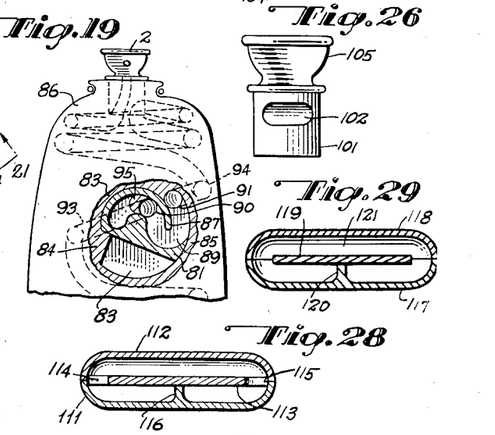
Fig. 19 is a similar view showing the tuning valve in a different position of adjustment.
Fig. 26 is a rear elevation of the same.
Fig. 28 is a modification in transverse section of the body of the instrument as shown in section in Fig. 7, the general plan and appearance of the instrument being exteriorly about the same as shown in Fig. 1, while the section is taken approximately on line 7—7.
Fig. 29 is another modification similarly shown in section.
Figures 20, 21:
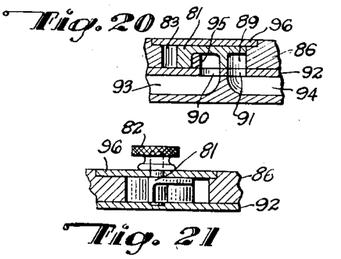
Fig. 20 is a section of Fig. 18 taken on line 20—20.
Fig. 21 is a partial section taken a little lower in Fig. 18 than Fig. 20 and shows substantially a side elevation of the tuning valve of Figs. 18, 19 and 20 as taken on line 21—21 in Fig. 18.

It is frequently desirable to be in a position to slightly sharpen or lower the pitch of the instrument by less than a full note and in fine gradations, and means for this are shown in Figs. 18 through 22. Figs. 18 and 19 illustrate a modification of the upper end of the instrument of Figs. 12 to 14 just described, a portion being removed to disclose the interior structure and a special adjusting or tuning valve 81 controlled by a knob 82 and capable of partial rotation in a valve chamber 83 from one extreme position against a stop 84 in Fig. 18 to another extreme position against the other side of the same stop. The valve member 81 operates against the arcuate wall 85 of channel member 86 of the instrument and has itself an arcuate wall 87 spaced from the fixed wall 85 and operating against an arcuate wall 88 of less diameter than, and forming a continuation of wall 85, so that a channel loop 89 is formed. This channel loop connects through apertures 90, 91 in the sandwich plate 92 with channels 93 and 94 communicating with the general channel system of the instrument as a whole. The solid connection of the wall 85 with the wall 83 above aperture 91 determines the connection of one end of the channel loop 89 with said aperture, while the other end is determined by a fixed terminal block 95 secured upon the sandwich plate above aperture 90 in said plate, the result being that upon rotation of the tuning valve 81 from one extreme to the other, the channel loop is gradually shortened so that the pitch of the instrument gradually rises. The apertures remain fixed, but the looped end of the channel loop approaches or recedes from said apertures in accordance with the direction of rotation, and when the instrument has been tuned to a local piano or band including other instruments, the tuning valve is left in whatever its attained position may be, and the instrument played by fingering the other valves in the same manner as upon a cornet or trumpet. A cover plate 96 for the adjusting valve may be riveted, screwed or cemented in place.

While only one form of mouthpiece and shank have been considered thus far, other preferable forms may be used which are centrally and symmetrically disposed instead of being offset as in Figs. 2 and 3, for example. Hence, in Figs. 23 through 26 are shown a fragment of the upper portion of an instrument with modified mouthpiece and shank as well as modified channels to cooperate therewith.

Figure 23:
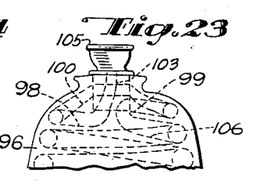
Fig. 23 is a fragmentary elevation of the upper part of the instrument of Fig. 1, showing a modification.
Figure 24:
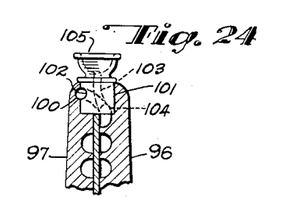
Fig. 24 is a vertical section of Fig. 23, but avoiding any section of the mouthpiece.
Figure 25:
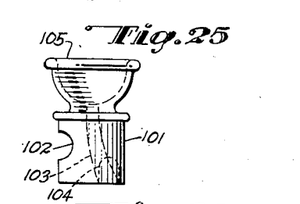
Fig. 25 is an enlarged side elevation of the mouthpiece alone of Figs. 23 and 24.
Figures 27, 35:
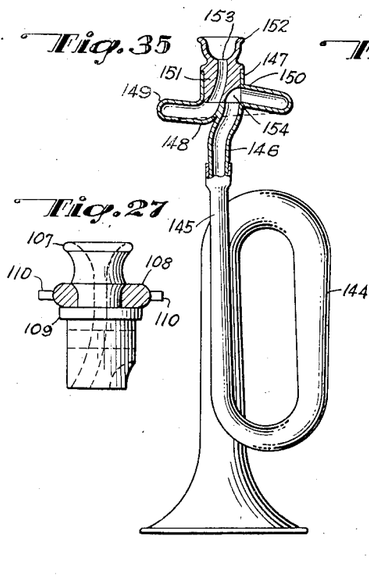
Fig. 27 is a modification of the mouthpiece of Fig. 26.
Fig. 35 illustrates a simple bugle or horn of the ordinary type with an important feature of my invention shown in section and combined with said bugle.

The channel member 97 of Figs. 23 and 24 has the short channels 98, 99 which cooperate with the mouthpiece shanks, connected by a rear channel 100 in channel member 97 which is raised so as to pass the rear of the shank transversely, while the shank 101 itself has a part of the transverse portion of said rear channel cut into the same as a groove 102 in order to avoid increasing the cross section of the instrument at that point. The channel or duct portions 103 and 104 connect with channels 98 and 99 in the position shown, but when the mouthpiece 105 is simply rotated toward the right until duct 103 registers with channel 106 of the general channel system of the instrument, the groove 102 on shank 101 no longer registers with channel 100 and the shank itself blocks channels 98 and 99. A slight modification of the mouthpiece is shown in Fig. 27 having the same type of shank, groove and duct portions, but the mouthpiece 107 has a ring 108 resting upon a flange 109 and provided with side studs 110, 110 adapted to be engaged by an elastic or the like in order to hold the mouthpiece as a whole down in place while allowing the same to be rotated for pitch changing, the ring remaining stationary without rotation meanwhile.

The body of the instrument is susceptible to modification, as will be more fully developed herein. For example, in the section of Fig. 28 the two channel members 111 and 112 are shown as completely enveloping the edges or periphery of the sandwich plate 113 so that the recesses 114, 115 at the sides are used instead of marginal apertures or perforations as in plate 8 of Fig. 6. The partitions 116 etc., between the channels support the sandwich plate in position, but the plate is then wholly contained with said channel members.

Figure 30:
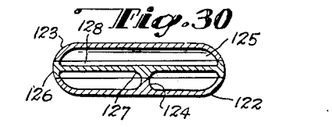
Fig. 30 is a further modification of a similar form in section.

Another form is shown in Fig. 29, wherein the channel members 117, 118 contain a sandwich plate 119 which is so narrow as to be spaced from the side walls of the channel members and is wholly supported between and suspended in position by the partitions 120 and 121 which of course extend to said side walls of the channel members. In Fig. 30, a form of construction is shown in which not only the channel members 122 and 123 have the rounded channels and intermediate partitions 124, 125, etc., but also the sandwich plate 126 has correspondingly rounded partition portions 127, 128, said sandwich plate being thus more than a flat, simple plate and instead forming a channeled structure of some thickness as shown in fragmentary perspective in Fig. 31.

Figure 32:
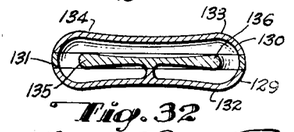
Fig. 32 is yet another modification in section of the instrument, similar to the section shown in Fig. 30.

Along similar lines of design is the modification shown in Fig. 32, the two channel members 129, 130 having a sandwich plate 131 between them and being enlarged toward the side edges at 132, 133 and 134, etc., so that the sandwich plate is thickened toward the sides 135, 136 to correspond in sectional profile with said channel members.

Figures 33, 34:
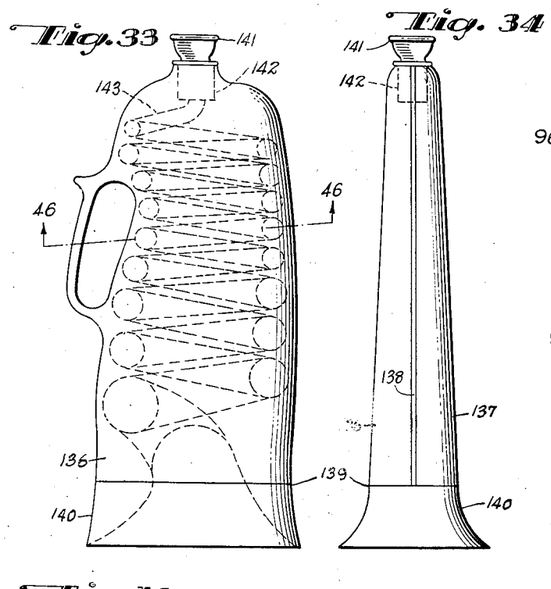
Fig. 33 illustrates a simpler form or modification of the instrument of Fig. 1.
Fig. 34 is a side elevation of the same.

In connection with modifications of the structure of the channel members, it may be pointed out that the whole ensemble of the instrument body may be assembled in somewhat different manner than already described. Hence, the channel members 136 and 137 of the instrument shown in Figs. 33 and 34 with an intermediate sandwich plate 138 may terminate at the bottom at a line 139 at which a bell 140 is attached or cemented in place, while at the top, a simple mouthpiece 141 which may have a shank 142 is inserted or secured. The pitch changing channels and features of instrument and mouthpiece may be omitted, if desired and the latter may simply connect directly with the main channel 143 of fixed pitch. Of course, the pitch changing features of the instruments of Figs. 1–5, 18–23, etc., may be incorporated, if so desired when thus adding the bell as a unit.

Figures 31, 36, 37:
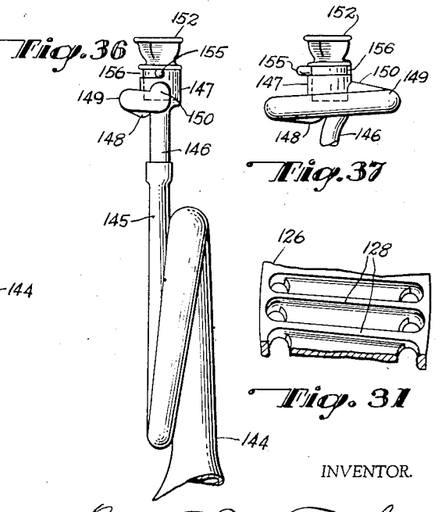
Fig. 31 is a fragmentary perspective view of part of an intermediate member or sandwich sheet of Fig. 30.
Fig. 36 is a partial side elevation of the same.
Fig. 37 is a fragmentary view of the bugle showing the mentioned feature in full from the same point of view as in Fig. 35.

On the other hand, the pitch changing feature alone is susceptible of application as such in appropriate form to existing types of brass wind instruments such as bugles, cornets, trumpets and horns as exemplified by the horn 144 in Figs. 35 and 36. To the stem 145 of the horn is attached a tube 146 which is connected to the bottom of a casing 147, to another portion of the bottom of which is connected one end 148 of a looped tube 149, while the other end 150 of said tube is connected to the lower part of one side of the same casing. This casing virtually forms a valve casing and contains the semi-rotary shank 151 of a mouthpiece 152; this shank having a channel 153 communicating with the interior of the mouthpiece at the upper end and at the lower end communicating either with left end 148 of the looped tube 149, or with the tube 146, depending on the position of the shank 151. (See also Fig. 37 for an alternate position of said shank.) In the lower portion of this shank is a bypass channel 154 which connects the end 150 of looper tube 149 with tube 146 when shank channel 153 connects with the left end 148 of said looped tube. A finger piece 155 upon the channel is displaceable in the cutout portion 156 in casing 147 and facilitates manual rotation of the mouthpiece and shank for changing the pitch.

Figure 39:
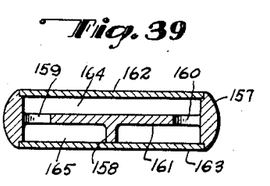
Fig. 39 is a further modification of the body of the instrument shown in a transverse section similar to that of Figs. 7 and 28.

Various other modifications of the body of the instrument are possible, but a few more having particular advantages and falling within the scope of the invention will be discussed. In Figs. 30 to 32, forms of the sandwich plate were shown which were not simply flat plates but actually recessed or channelled, or shaped to some extent and in each case of some considerable thickness; but in Fig. 39, a form is illustrated in which the portion corresponding to the sandwich plate forms the main frame of the instrument body 157 in which the partition 158, for example forms an integral portion of said frame and the apertures 159, 160 pierce the interior portion 161 of said frame. The outer plates 162, 163 are set into or onto the sides and serve to enclose the channels 164, 165, etc., and finish off the sides of the instrument.

Figure 40:
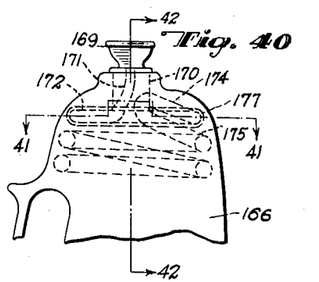
Fig. 40 is a fragmentary view of the upper part of the instrument showing a modification of Fig. 12.
Figure 40A:
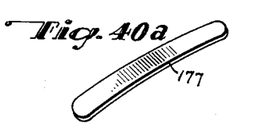
Fig. 40a is a perspective view of a rear part of Fig. 40.
Figure 41:
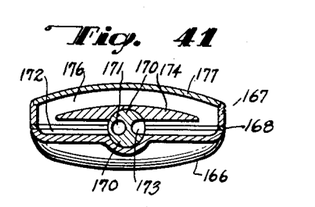
Fig. 41 is a transverse section of the same taken on line 41—41 in Fig. 40.
Figure 42:
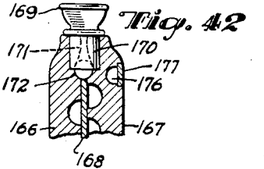
Fig. 42 is a vertical section also of the same taken on line 42—42 in Fig. 40.

Another form particularly involving an advantageous arrangement of the mouthpiece and its related channels is shown in Figs. 40 to 42, there being, for example, two channel members 166, 167 and a sandwich plate 168; while the mouthpiece 169 has a shank 170 centrally and symmetrically disposed with respect to the sandwich plate and channel members. This shank has the main channel 171 which in the position shown connects with the instrument channel 172 and the short bypass channel 173 connecting the two instrument channels 174 and 175 which in turn connect with the rear instrument channel 176, forming with channels 172 and 174 the pitch changing loop capable of being cut in or out by rotating the mouthpiece one-half revolution in either direction. The mouthpiece or its shank may be provided with a finger piece as in Figs. 35–37, if desired. In order to allow for the molding of rear channel 176, the back of the same is left open, and then when the instrument is assembled, a strip 177 of plastic or metal also shown in Fig. 40a is cemented or otherwise secured in place to enclose the channel.

Figure 43:
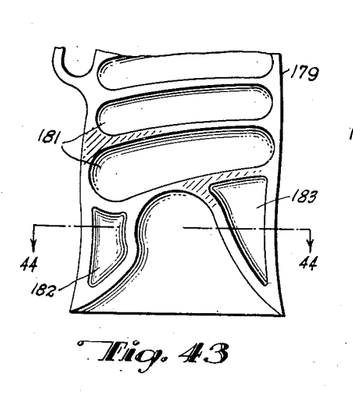
Fig. 43 is a fragmentary view of the lower part of a channel member of the body of the instrument showing how the same may be modified throughout to include air spaces which are not connected to the main air channel but are independent thereof.
Figure 44:
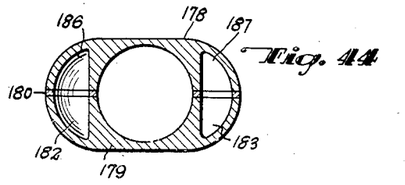
Fig. 44 is a transverse section of the instrument as taken on line 44—44 in Fig. 43.
Figure 45:
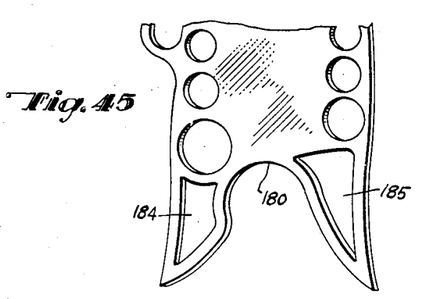
Fig. 45 is a fragmentary perspective of the intermediate member or sandwich sheet which may be used with the channel member of Fig. 43.

It may be desirable in some cases to include blind chambers to serve as resonance chambers in order to favorably affect the timbre and tone of the sounds produced by the instrument, and a form of the instrument embodying such construction is shown at least partly in Figs. 43 to 45 but sufficiently to show how such chambers may be incorporated at various points of the structure. The channel members 178 and 179 are provided with the sandwich plate 180 (Fig. 44) but in those portions not usually occupied by any sound channels 181, for example, resonance chambers or hollow portions 182, 183 which may extend as open areas 184, 185 through the sandwich plate 180 and continue in channel member 178 as chambers 186, 187, or the sandwich plate can be solid and form a partition separating chambers 182 and 183 from chambers 184, 185, if desired.

Figure 46:
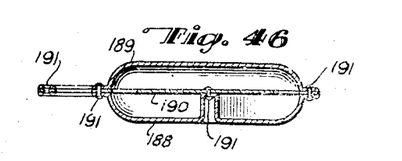
Fig. 46 is a transverse section of the instrument taken on line 46—46 in Fig. 33, but showing a further modification of the construction.

While it has already been stated that the channel members and sandwich plate may be made of plastic material or of die cast metal, but they can also be stamped from sheet metal as shown in section in Fig. 46. The two stamped metal channel members 188 and 189 may be soldered or brazed to a sheet metal sandwich plate 190, or may be secured thereto by means of rivets 191, 191, etc., or in any other practical manner, and the metal used may be sheet iron, steel, copper, brass, German silver, silver, gold or any alloy.

The valved instrument of Figs. 12 to 16 may have a tuning valve added to the same as shown in Figs. 18 to 21, or of any other type, as shown in Figs. 47, 48, 51 and 54, and the mouthpiece and its related channels may be modified and rotatable for pitch adjustment, if desired. The instrument generally indicated by 192 has the finger pieces 56', 56', etc., controlling valves as in said former figures, while the channel 192 leading to and controlled by said valves, may be tuned by a valve 193 by means of a finger piece or head 194. The valve may conveniently be housed in the rear channel member 195 in a recess 196 in which it may rotate part of a revolution in order to slightly lengthen or shorten the air column distance between apertures 197 and 198 connecting with channels 192 and 199. The valve has an arcuate partition 200 and a bent channel 201 connecting in all positions with channel 202 because partition 200 glides along fixed partition 203 and thus virtually forms a continuation of the latter in extended position and also increases the effective length of channel 202, thereby lowering the tone. The valve is preferably located wholly upon one side of the sandwich plate 204, but may, if desired, extend through the same and ride upon the flat inside portion or face of channel member 205.

While in Figs. 18 and 19 the apertures 90 and 91 would seem necessary to make valve 81 operative, the valve 193 can operate directly with channels upon the same side of the sandwich plate, if desired, even though shown operating to and from apertures 197 and 198, and I reserve such structure as part of the present disclosure.

Figures 47, 48, 49, 50, 51, 52, 53, 54:
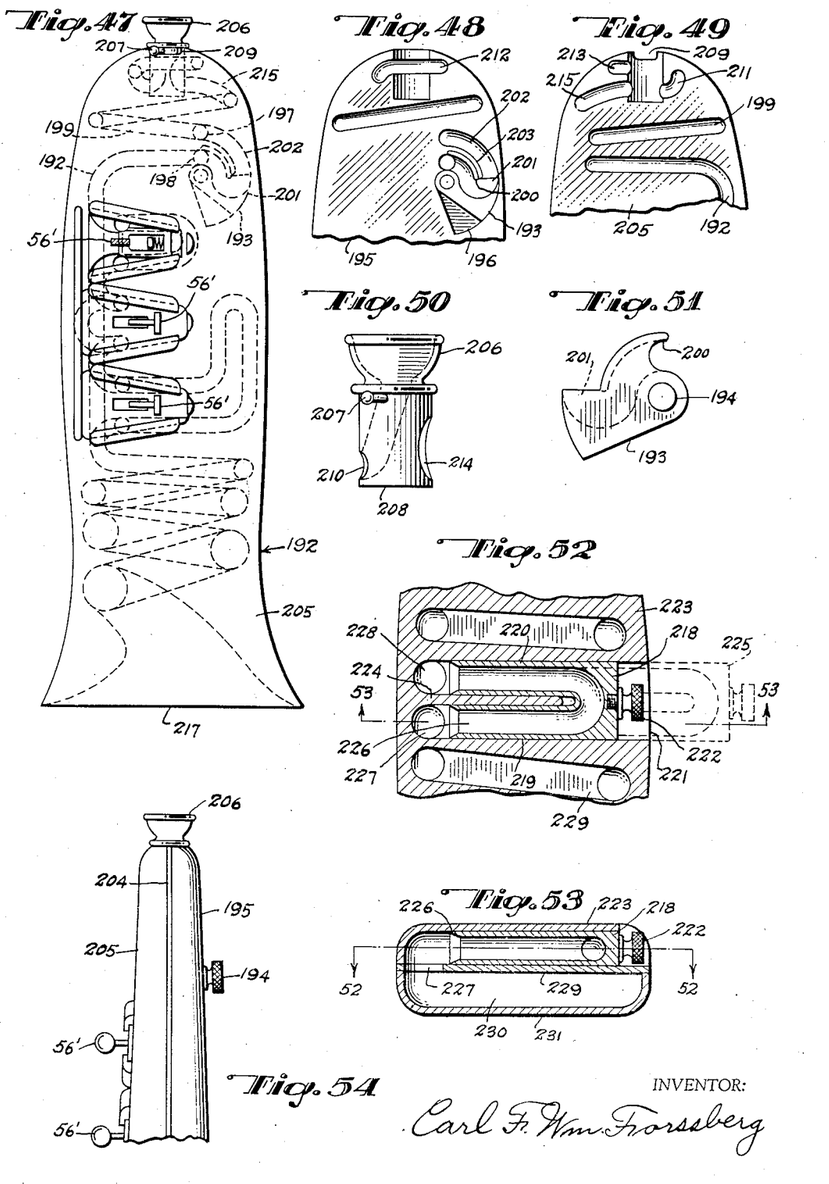

Turning our attention to the mouthpiece 206, the same is preferably provided with a finger piece 207 upon its shank 208 shiftable in the recess 209 to partly rotate the mouthpiece. The latter has a longer shank than on the other mouthpieces previously described. The shank has a main channel 210 which connects in one position with channel 211 in member 205, which is connected through the sandwich plate to a rear transverse channel 212 in rear channel member 195. Channel 212 again connects through the sandwich plate with the short channel 213 in member 195, and this in turn connects through the bypass channel 214 in shank 208 with channel 215 in member 205, and this forms the actual operating channel of the instrument continuing through channels 216, 199 and 192, etc., down to the bell 217. This deep or long form of shank and channel arrangement improves moisture drainage.

An alternative to the turning valves 81 and 193 of Figs. 18-21 and Figs. 47, 48 and 51, respectively, is shown by a tuning slide 218 in Figs. 52 and 53, which may take the form of a V-shaped member or box with two hollow legs 219 and 220 slidable in a channel 221 by means of a finger piece 222.

The channel member 223 preferably has a central partition 224 in the channel 221 which is straddled by the legs 229 and 230 so that no opening results between them in the channel member even when the turning slide 218 is drawn far out to the position indicated at 225. The channel 226 in the slide connects through the apertures 227, 228 in the sandwich plate 229 with the channels 230 etc., in the channel member 231. It is clearly evident that when the tuning slide is drawn out into a more or less extended position, the air column is lengthened and the pitch lowered in accordance with the degree of extension, and if the slide is pushed in toward apertures 227 and 228, the air column is shortened and the pitch correspondingly raised.

In the remaining figures of the drawings, namely, Figs. 55 through 63, three further forms of the fundamental construction of the instrument body are shown. In Figs. 55 to 58 is shown a form in which two channel members 232, 233 have a simple mouthpiece 234 connected to the upper ends of the respectively corresponding channels 235, 236, but are devoid of any sandwich plate to form a partition for the channels. Hence, said channels are simply doubled upon themselves in the same general plane which either coincides with the cleavage plane of the two channel members or is parallel thereto, the channels increasing in cross sectional area as they descend toward the bell 237 and terminate in the flaring ends 238, 239 in said channel members.

Figure 55:
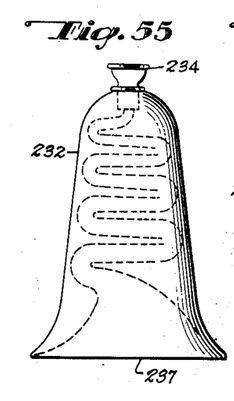
Fig. 55 is a front elevation of a modification or simplification of the instrument of Figs. 33 and 34.
Figure 56:
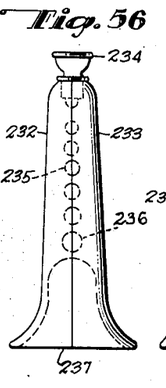
Fig. 56 is a side elevation of the same.
Figure 57:
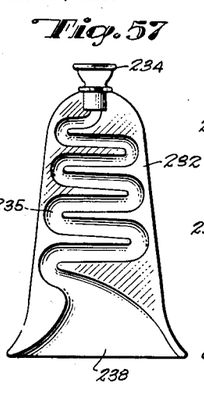
Fig. 57 illustrates a channel member of the same instrument.
Figure 58:
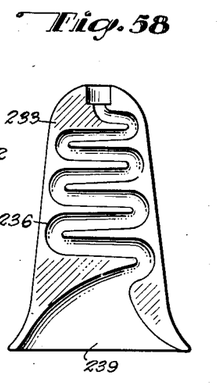
Fig. 58 shows an opposite corresponding channel member of said instrument.
Figure 59:
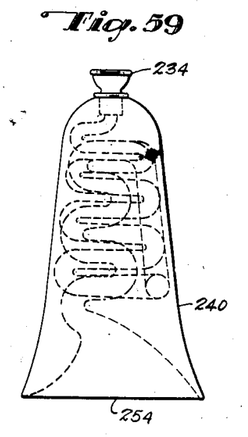
Fig. 59 is a front elevation of another modification of the instrument of Figs. 33 and 34.
Figure 60:
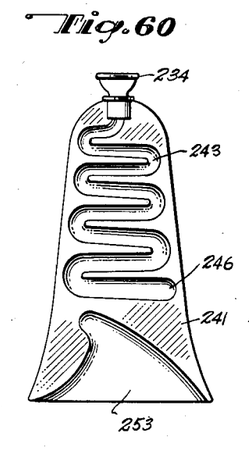
Fig. 60 shows one channel member of the instrument of Fig. 59.
Figure 61:
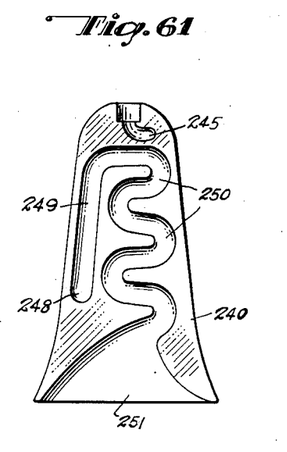
Figure 62:
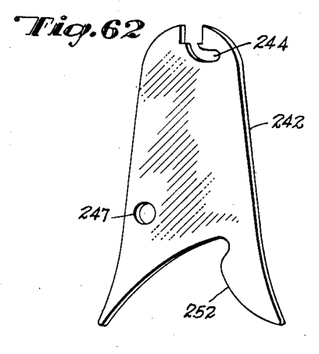
Fig. 62 is a perspective view of a sandwich plate for the same instrument.

The form of instrument body shown in Fig. 59 has not only the two channel members 240 and 241, separately shown in Figs. 60 and 61, but also a sandwich or partition plate 242 shown in Fig. 62, and of course, a mouthpiece 234 similar to that of Figs. 55 to 57. This form of the invention shows that the channel 243 in channel member 241 connects with the mouthpiece and in order to centrally meet the same penetrates the sandwich plate 242 at 244 and has a corresponding short channel portion 245 in channel member 240. Said channel 243 is doubled upon itself in channel member 241 and terminates in said member at 246 where the end registers with the aperture 247 in the sandwich or partition plate 242. This aperture registers upon the other side of the plate with the end 248 of the ascending channel 249 which in the main portion of member is doubled upon itself so as to form convolutions 250 and finally terminate in the flaring opening 251 which extends through the open portion 252 in the partition plate and together with the flaring portion 253 of member 241 forms the interior of the bell 254 of the instrument. In this form, the number of apertures in the sandwich plate is greatly reduced, which is an advantage for some purposes.

Figure 63:
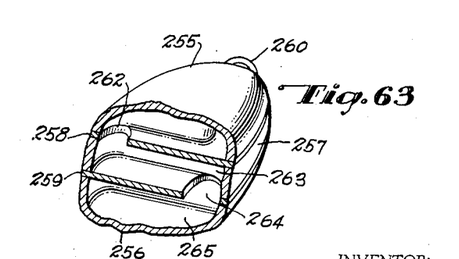
Fig. 63 is a fragmentary section as seen in perspective, of a further modification of the construction of the body portion of the instrument of Figs. 33 and 34.

Finally, in the form illustrated in Fig. 63, two outer channel members 255, 256 have an intermediate or third channel member 257 disposed between them with two sandwich or partition plates 258, 259 interleaved between the outer and intermediate members, a mouthpiece 260 being of course included. The channel 261 of the first member 255, for example, thus connects through an aperture 262 in plate 258 with the channel 263 in intermediate member 257, and this channel in turn connects through an aperture 264 in the second plate 259 with the channel 265 in bottom member 256. The channels may also follow some other course or arrangement in the channel members when three such members are used together with one or more interleaved plates. It is evident that the tuning and/or playing valves may be combined with all forms.

In the foregoing, my instrument has been shown capable of variation as to some features, the body channel members being always present and at least one, and often two in number or may be even three or more, while the partition plate or structure may have few (at least one) or many marginal apertures, while the construction may include other types of tuning valves or slides, or other manual playing valves than those described, not to mention that the mouthpiece may be simple and more or less conventional, or may be of special construction and combined with pitch changing channels in the instrument when desired.

Hence, variations within wide limits may be resorted to, and parts may be used without others or in different combinations therewith and of different plastics and metals, so as to result in various instruments within the scope of the invention as a broad basis under construction.

Having now fully described my invention, I claim:

1. An instrument body for a wind instrument, including a hollow body member having individually continuous partition means subdividing the interior thereof into a plurality of duct portions alternately directed in substantially opposite directions, with corresponding ends of mutually adjacent duct portions connected in pairs to form a series of ducts constituting an air column sound passage, and at least a portion of the partition means comprising a separating wall disposed between the two mutually adjacent duct portions in each pair of the latter, which separating wall is common to both of said two mutually adjacent duct portions along at least part of its extent and terminates at least at one end thereof short of the respectively adjacent side wall of the body member, said separating wall thereby providing in each said pair of mutually adjacent duct portions an end clearance portion or gap located between said side wall of the body member and the termination of the separating wall and constituting the connection between the connected ends of each pair of mutually adjacent duct portions.

2. An instrument body according to claim 1, in which the partition means are plate-like and disposed substantially in a single plane.

3. An instrument body according to claim 1, in which the partition means are disposed in a series having the duct portions located individually between said partition means and spacing the latter apart in substantially mutual parallelism.

4. An instrument body according to claim 1, in which each separating wall in a given group thereof terminates at both ends short of both of the opposite side walls respectively adjacent to the ends of the separating wall involved and causes each duct portion associated with each separating wall in said group to form a connected pair or couple with the immediately following duct portion.

5. An instrument body according to claim 1, in which the partition means are disposed in a plurality of substantially parallel planes.

6. An instrument body according to claim 1, in which each separating wall in a given group thereof terminates at both ends short of both of the opposite side walls of the body member respectively adjacent to the ends of the separating wall involved and causes each duct portion associated with each separating wall in said group to form a connected pair or couple with the immediately following duct portion on the other side of the same separating wall.

CARL F. WM. FORSSBERG.